United States Patent [19]  
Shima et al.

[11] 3,914,339  
[45] Oct. 21, 1975

[54] PROCESS FOR PRODUCING RUBBER-MODIFIED PLASTICS

[75] Inventors: Takesaburo Shima, Toyonaka; Sukehiko Sakamoto; Yoshikazu Fujii, both of Ibarak, all of Japan

[73] Assignee: Sumitomo Chemical Company, Limited, Japan

[22] Filed: July 23, 1973

[21] Appl. No.: 381,522

Related U.S. Application Data

[63] Continuation of Ser. No. 154,636, June 18, 1971, abandoned.

[30] Foreign Application Priority Data

June 24, 1970  Japan.............................. 45-55526

[52] U.S. Cl.......... 260/880 R; 260/878 R; 260/881
[51] Int. Cl.$^2$........................C08L 9/00; C08L 23/06; C08L 23/08; C08L 23/16
[58] Field of Search............. 260/878 R, 880 R, 881

[56] References Cited
UNITED STATES PATENTS

| | | | |
|---|---|---|---|
| 3,428,712 | 2/1969 | Carrock et al...................... | 260/880 |
| 3,448,175 | 6/1969 | Doak et al....................... | 260/880 R |
| 3,642,950 | 2/1972 | O'Shea............................ | 260/878 R |
| 3,694,522 | 9/1972 | Tsuruta et al................... | 260/878 R |
| 3,696,172 | 10/1972 | Kaiho et al...................... | 260/880 R |
| 3,719,731 | 3/1973 | Schuster et al. ................ | 260/878 R |

*Primary Examiner*—Harry Wong, Jr.
*Assistant Examiner*—A. Holler
*Attorney, Agent, or Firm*—Craig & Antonelli

[57] ABSTRACT

A process for producing rubber-modified plastics excellent in impact strength and color rendering which comprises dissolving rubber into a mixture of acrylonitrile and styrene containing or not one or more of other vinyl monomers copolymerizable with them, subjecting the resultant solution to bulk polymerization under heating without using any polymerization initiator until the total conversion of the vinyl monomers reaches to a range of 3.5 to 15% by weight, adding a chain transfer agent to the resulting reaction mixture, continuing the bulk polymerization until the total conversion of the vinyl monomers reaches to a range of 20 to 40% by weight and subjecting the thus prepared prepolymer to suspension polymerization in the presence of lauroyl peroxide as a polymerization initiator.

18 Claims, No Drawings

PROCESS FOR PRODUCING RUBBER-MODIFIED PLASTICS

This is a continuation of application Ser. No. 154,636 filed June 18, 1971, now abandoned.

The present invention relates to a process for producing rubber-modified plastics. More particularly, it relates to a process for producing rubber-modified plastics excellent in impact strength and color rendering.

In the production of rubber-modified plastics, it is known that, for realizing the uniform dispersion of rubber particles, a solution of rubber in vinyl monomers is first subjected to bulk polymerization and then the resultant prepolymer is subjected to suspension polymerization (bulk-suspension polymerization process). When, however, acrylonitrile is used as one of the vinyl monomers, unfavorable coloring is seen in the resulting product. The appearance of rubber-modified plastics which are not colored and have excellent color rendering has been thus demanded for a long time.

On the other hand, the rubber particles in the said rubber-modified plastics are required to be finely minimized so as to maintain the favorable physical properties inherent to the original plastics and assure the even quality of the modified plastics.

Moreover, it is highly desired to produce rubber-modified plastics provided with advantageous physical properties such as high impact strength, excellent tensile strength and good heat resistance with easy elimination of the heat of polymerization at an industrial scale.

For production of the rubber-modified plastics which meet the above demand and desire, there have been made various attempts, of which some examples are as follows: a process wherein lauroyl peroxide is used as a polymerization initiator [French Pat. No. 1,463,227]; a process wherein a specific peroxide is used [Japanese Pat. publication No. 1825/1970]; a process wherein the polymerization initiators in the bulk polymerization and the suspension polymerization are different from each other [Japanese Pat. publication No. 27815/1969]; a process wherein the bulk polymerization admixed with a part of a chain transfer agent is accomplished under heating and, after the addition of the residual chain transfer agent, the suspension polymerization step is performed [Japanese Pat. publication No. 11468/1966].

The present inventors previously found that, in the bulk-suspension polymerization process, the graft reaction to rubber is initiated without any chain transfer agent and, after the proceeding of the reaction to a certain extent, a chain transfer agent is added thereto whereby the particles of rubber are well minimized and a rubber-modified plastic provided with a satisfactory processability is obtained. When, however, the reaction conditions in the bulk polymerization step and the suspension polymerization step are not appropriately selected, the produced rubber-modified plastic is inferior in impact strength and colored unfavorably. Further, in case of the polymerization rate being too large, a large-sized reaction vessel can not be used so that the economical execution of the process is difficult. Furthermore, in case that the polymerization rate is too small, the dispersion of rubber particles in the bulk polymerization becomes difficult and the coagulation of rubber particles once dispersed is caused in the suspension polymerization.

As the results of the extensive study, it has been found that the execution of bulk polymerization under heating followed by suspension polymerization, the addition of a chain transfer agent at a certain stage and the use of a suitable polymerization initiator in the suspension polymerization make it possible the production of rubber-modified plastics containing finely minimized rubber particles and having high impact strength and good color rendering with removing the heat of polymerization at an industrial scale.

According to the present invention, rubber is dissolved in a mixture of acrylonitrile and styrene containing or not one or more of other vinyl monomers copolymerizable with them, the resultant solution is subjected to bulk polymerization under heating without using any polymerization initiator until the total conversion of the vinyl monomers reaches to a range of 3.5 to 15 % by weight, a chain transfer agent is added to the resulting reaction mixture, the bulk polymerization is continued until the total conversion of the vinyl monomers reaches to a range of 20 to 40 % by weight and the thus prepared prepolymer is subjected to suspension polymerization in the presence of lauroyl peroxide as a polymerization initiator, whereby a rubber-modified plastic excellent in impact strength and color rendering is produced.

The rubber may be one which shows a rubbery state at room temperature and is reacted with a radical produced by the action of heat or a radical initiator to participate in graft polymerization. Examples of the rubber include polybutadiene, polyisoprene, styrene-butadiene copolymer (SBR), chlorinated polyethylene, ethylene-vinyl acetate copolymer (EVA), ethylene-propylenediene monomer terpolymer (EPDM), nitrile rubber (NBR), etc. The amount of the rubber is usually from 2 to 20 parts by weight per 100 parts by weight of the vinyl monomers. The rubber is favored to be dissolved in the vinyl monomers at room temperature or at a temperature under which the vinyl monomers are not polymerized.

As the vinyl monomers other than acrylonitrile and styrene which may be optionally used, there may be exemplified α-methylstyrene, dimethylstyrene, chlorostyrene, etc. The weight ratio of acrylonitrile and styrene may be from 15 : 85 to 40 : 60. The amount of the vinyl monomers(s) to be optionally employed may be from 0 to 15 parts by weight to 100 parts by weight of acrylonitrile and styrene.

The thermal polymerization in the bulk polymerization step is effected ordinarily at 85° to 130°C, preferably at 90° to 110°C. The polymerization rate is varied with the composition of the vinyl monomers and the temperature of polymerization, and a higher polymerization temperature will generally result in a larger polymerization rate.

When the conversion of the vinyl monomers reaches to a range of 3.5 to 15 % by weight, a chain transfer agent is added to the reaction system whereby the particles of rubber are minimized to 1 μ or less. In case of the polymerization rate being small, impurities in the reaction system afford serious influences on the activity of the chain transfer agent so that the graft reaction to the rubber and the minimization of the rubber particles are inhibited, the production of a rubber-modified plastic excellent in impact strength is prevented and the completion of the polymerization takes a long time. In case of the polymerization rate being large, the heat of polymerization is generated in a high rate and the viscosity of the reaction system is increased with the progress of the polymerization so that the elimination of the heat of polymerization at an industrial scale becomes difficult. Thus, the polymerization rate is required to be appropriately controlled.

As the chain transfer agent, there may be employed any material having a chain transfer ability, and the use of a mercaptan, particularly alkylmercaptan having 4 to 16 carbon atoms, is preferred. The amount of the mercaptan is normally from 0.05 to 0.6 % by weight on the basis of the total amount of the vinyl monomers.

After the addition of the chain transfer agent, the thermal polymerization is further continued until the conversion of the vinyl monomers reaches to a range of 20 to 40 % by weight. When the conversion is lower, the stability of the rubber particles is not good. When the conversion is higher, the viscosity of the reaction system becomes high so that stirring will be made difficult.

The prepolymer obtained in the bulk polymerization is then suspended in water in the presence of a suitable suspending agent. The amount of water may be from 1 to 6 times, preferably from 1 to 3 times, as much as the weight of the prepolymer. When the amount of water is too small, the elimination of the heat of polymerization is difficult. When the amount of water is too large, the production efficiency becomes low. As the suspending agent, there may be employed polyvinyl alcohol (PVA), hydroxyethylcellulose (HEC), hydroxypropylcellulose (HPC), methylhydroxypropylcellulose (metrose) or the like. The amount of the suspending agent is usually from 0.1 to 1.0 % by weight, preferably from 0.2 to 0.8 % by weight, on the basis of the total amount of the vinyl monomers.

On suspending the prepolymer in water, monomeric acrylonitrile may be dissolved in water whereby the composition of the prepolymer will be considerably changed. Therefore, if desired, a certain amount of acrylonitrile may be previously dissolved in the suspension polymerization system so as to keep materially unchanged the composition of the prepolymer.

The suspension of the prepolymer may further contain a water phase polymerization inhibitor, for example, sodium bisulfite in a concentration of 50 to 2,000 ppm, preferably 100 to 1,000 ppm to water for preventing the coloration of a rubber-modified plastic as the final product.

The suspension polymerization is carried out in the presence of lauroyl peroxide. When any other polymerization initiator is used, unfavorable coloring or inferior impact strength may be caused. For example, when t-butyl peroxybenzoate, t-butyl peroxylaurate, benzoyl peroxide, n-butanoyl peroxide, azobisisobutyronitrile or the like is used, the obtained rubber-modified plastic will be colored. Further, for example, when dicumyl peroxide, di-t-butyl peroxide, azobisisobutyronitrile, azobisisovaleronitrile, n-butanoyl peroxide or the like is used, the obtained rubber-modified plastic will become inferior in impact strength. Thus, the use of lauroyl peroxide in this step is critical and essential.

The amount of lauroyl peroxide may be from 0.4 to 3.0 % by weight, preferably from 0.6 to 2.0 % by weight, on the basis of the total amount of the vinyl monomers. When the amount of lauroyl peroxide is larger, the impact strength of the obtained rubber-modified plastic is still good but the polymerization rate becomes high and the elimination of the heat of polymerization at an industrial scale is made difficult. When the amount of lauroyl peroxide is smaller, the polymerization rate becomes small and elimination of the heat of polymerization at an industrial scale is made easy. However, the obtained rubber-modified plastic is inferior in impact strength and the rubber particles once minimized in the bulk polymerization step may be coagulated each other.

The suspension polymerization temperature may be from 60° to 120°C, preferably from 65° to 100°C. The maintenance of the temperature within this range is, however, not necessarily required, and the temperature may be sometimes raised after solidification of the reaction mixture.

Prior to execution of the polymerization in the above process, it is preferable to replace the oxygen present in the polymerization system by an inert gas.

Practical and presently preferred embodiments of the present invention are illustratively shown in the following Examples wherein parts are by weight. These Examples should not be construed as the limitations of the scope of the invention.

EXAMPLE 1

In a 30 liter volume autoclave, styrene (70 parts) and acrylonitrile (30 parts) are charged, and polybutadiene rubber (NF-35A manufactured by Asahi Chemical Industry Co., Ltd.) (7 parts) is dissolved therein. After replacing the atmosphere by nitrogen, bulk polymerization is carried out at 100°C for 8 hours, during which t-dodecylmercaptan (0.4 part) as a chain transfer agent is added thereto when the conversion of the vinyl monomers reaches 7.2 % by weight so that the rubber particles are minimized finely. The final conversion of the vinyl monomers is 27.8 % by weight. The obtained prepolymer (107 parts) is charged in a 100 liter volume autoclave and suspended in water (300 parts) containing polyvinyl alcohol (0.14 part) and metrose (0.06 part) as suspending agents and sodium bisulfite (0.15 part; 500 ppm in water) as a water phase polymerization inhibitor. Lauroyl peroxide (1.0 part) as a polymerization initiator is added thereto. The resultant suspension is subjected to polymerization at 70°C for 3 hours and at 90°C for 1 hour.

The produced polymer beads are subjected to stripping with steam at 150°C for 5 hours so as to eliminate unreacted vinyl monomers. The average diameter of rubber particles observed by an electron microscope is 0.67 $\mu$. The polymer is extruded at 190°C by a 25 m/m extruder and subjected to injection molding at 260°C to make a test piece, whose notched charpy impact strength and tensile strength are 10.6 kg.cm/cm$^2$ and 660 kg/cm$^2$, respectively. Yellowness index determined according to ASTM-D 1925-63T is 5.0 NBS scale. Thus, the polymer contains finely minimized rubber particles and shows excellent impact strength and good color rendering. The remaining styrene in the polymer is 0.07 % by weight.

Reference Examples 1 to 8

Bulk polymerization is carried out in the same manner as in Example 1. Then, suspension polymerization is performed as in Example 1 but varying the polymerization initiator, the polymerization temperature and the polymerization time. The produced polymer contains rubber particles of about 0.7 $\mu$ in average diameter. The results are shown in Table 1, from which it is apparent that, when t-butyl peroxybenzoate, t-butyl peroxylaurate or benzoyl peroxide is used as the polymerization initiator, the produced polymer has an excellent impact strength but its yellowness index is large as the remaining amount of styrene becomes small, and the polymer is poor in color rendering. When n-butanoyl peroxide, dicumyl peroxide or di-t-butyl peroxide is used, the impact strength of the produced polymer is somewhat decreased. In case of using azobisisobutyronitrile or azobisisovaleronitrile, the impact strength is remarkably decreased.

EXAMPLES 2 to 6

As in Example 1, bulk polymerization and suspension polymerization are executed under the conditions as shown in Table 2. Still, in Example 6, acrylonitrile monomer (6 parts) as a stabilizer for the prepolymer is added to the water phase of the suspension polymerization system, and the stripping with steam at 150°C is carried out for 3 hours. The results are shown in Table 2.

Table 1

| Reference Example No. | Polymerization initiator Kind | Amount (part) | Suspension polymerization Temperature (°C) | Time (hrs.) | Amount of sodium bisulfite (ppm in water) | Produced polymer Notched charpy impact strength (kg.cm/cm$^2$) | Yellowness index (NBS scale) | Amount of remaining styrene |
|---|---|---|---|---|---|---|---|---|
| 1 | t-Butyl peroxybenzoate | 0.3 | 125 / 135 | 2.5 / 1 | 500 | 9.8 | 52.6 | 0.05 |
| 2 | t-Butyl peroxylaurate | 0.5 | 115 / 125 | 2.5 / 2 | 500 | 10.8 | 43.8 | 0.12 |
| 3 | Benzoyl peroxide / t-Butyl peroxybenzoate | 0.6 / 0.02 | 90 | 2.5 | 500 | 10.6 | 24.8 | 0.25 |
| 4 | n-Butanoyl peroxide | 0.6 | 78 / 100 | 2 / 2 | 500 | 7.3 | 27.6 | 0.51 |
| 5 | Dicumyl peroxide | 0.2 | 120 / 130 | 2.5 / 1.5 | 500 | 7.1 | 5.2 | 0.11 |
| 6 | Di-t-butyl peroxide | 0.1 | 130 / 140 | 2 / 3 | 500 | 7.7 | 5.8 | 0.08 |
| 7 | Azobisisobutyronitrile | 0.5 | 60 / 80 | 3 / 1 | 500 | 3.8 | 50.7 | 0.17 |
| 8 | Azobisisovaleronitrile | 0.8 | 70 / 90 | 2 / 1 | 500 | 4.7 | 12.6 | 0.21 |

Table 2

| Example No. | 2 | 3 | 4 | 5 | 6 |
|---|---|---|---|---|---|
| Bulk polymerization Rubber (parts) | PBR "NF-35A"* / 7 | PBR "NF-35A" / 7 | SBR "Tufden 2000A"** / 12 | SBR "Tufden 2000 A" / 5 | PBR "NF-35A" / 8 |
| Styrene (parts) | 70 | 70 | 80 | 70 | 75 |
| Acrylonitrile (parts) | 30 | 30 | 20 | 30 | 25 |
| Comonomer (parts) | α-Methylstyrene 5 | Dimethylstyrene 5 | — | — | — |
| Temperature (°C) | 105 | 105 | 100 | 95 | 100 |
| Time (hrs.) | 4 | 4 | 8 | 10 | 8 |
| Chain transfer agent (part) | t-Dodecylmercaptan 0.3 | t-Dodecylmercaptan 0.3 | MTM***) 0.2 | MTM 0.35 | t-Dodecylmercaptan 0.4 |
| Conversion of vinyl monomers at addition of chain transfer agent (% by weight) | 5.8 | 5.5 | 6.4 | 5.9 | 7.0 |
| Conversion of vinyl monomers at end of polymerization (% by weight) | 23.8 | 24.5 | 26.7 | 25.1 | 24.3 |
| Suspension polymerization | 2 | 3 | 4 | 5 | 6 |
| Prepolymer (parts) | 112 | 112 | 112 | 105 | 108 |
| Water (parts) | 300 | 300 | 300 | 300 | 300 |
| Polyvinyl alcohol (part) | 0.14 | 0.14 | 0.21 | 0.18 | 0.17 |
| Metrose (part) | 0.06 | 0.06 | 0.09 | 0.07 | 0.075 |
| Lauroyl peroxide (parts) | 1.0 | 1.0 | 1.8 | 0.8 | 0.6 |
| Temperature (°C) | 70 / 90 | 75 / 90 | 78 / 90 | 70 / 90 | 70 / 90 |
| Time (hrs.) | 4 / 2 | 3 / 2 | 2 / 2 | 3 / 2 | 4 / 1 |
| Sodium bisulfite (ppm in water) | 500 | 500 | 300 | 500 | 500 |
| Produced polymer Diameter of rubber particles ($\mu$) | 0.73 | 0.64 | 0.72 | 0.79 | 0.81 |

Table 2 — Continued

| Example No. | 2 | 3 | 4 | 5 | 6 |
|---|---|---|---|---|---|
| Notched charpy impact strength (kg.cm/cm$^2$) | 10.4 | 9.9 | 15.9 | 8.0 | 11.5 |
| Yellowness index (NBS scale) | 5.1 | 5.3 | 6.1 | 4.7 | 8.3 |
| Remaining vinyl monomer (% by weight) | 0.13 | 0.20 | 0.17 | 0.05 | 0.20 |

Note:
\*) Polybutadiene rubber manufactured by Asahi Chemical Industry Co., Ltd.;
\*\*) Styrene-butadiene rubber manufactured by Asahi Chemical Industry Co., Ltd.;
\*\*\*) Mixture of t-dodecylmercaptan (60 parts), t-tetradecylmercaptan (20 parts) and t-hexadecylmercaptan (20 parts)

What is claimed is:

1. A process for producing rubber-modified plastics excellent in impact strength and color rendering which comprises dissolving rubber into a mixture of vinyl monomers containing acrylonitrile and styrene, subjecting the resultant solution to bulk polymerization under heating without using any polymerization initiator until the total conversion of the vinyl monomers reaches a range of 3.5 to 15 % by weight, adding a chain transfer agent to the resulting reaction mixture, continuing the bulk polymerization until the total conversion of the vinyl monomers reaches a range of 20 to 40 % by weight, and subjecting the thus prepared prepolymer to suspension polymerization in the presence of lauroyl peroxide as a polymerization initiator.

2. The process according to claim 1, wherein the rubber is polybutadiene, polyisoprene, styrene-butadiene copolymer, chlorinated polyethylene, ethylene-vinyl acetate copolymer, ethylene-propylene-diene monomer terpolymer or nitrile rubber.

3. The process according to claim 1, wherein the rubber is used in an amount of 2 to 20 parts by weight per 100 parts by weight of the vinyl monomers.

4. The process according to claim 1, wherein the proportion of acrylonitrile to styrene is from 15 : 85 to 40 : 60 by weight.

5. The process according to claim 1, wherein said mixture of vinyl monomers further contains at least one other vinyl monomer selected from the group consisting of α-methylstyrene, dimethylstyrene and chlorostyrene.

6. The process according to claim 5, wherein the other vinyl monomers are used in an amount of 0 to 15 parts by weight per 100 parts by weight of the combined amount of acrylonitrile and styrene.

7. The process according to claim 1, wherein the bulk polymerization is effected under heating at 85° to 130°C.

8. The process according to claim 1, wherein the chain transfer agent is a mercaptan having 4 to 16 carbon atoms.

9. The process according to claim 8, wherein the chain transfer agent is used in an amount of 0.05 to 0.6 % by weight on the basis of the total amount of the vinyl in said mixture.

10. The process according to claim 1, wherein the amount of lauroyl peroxide is from 0.4 to 3.0 % by weight on the basis of the total amount of the vinyl monomers.

11. The process according to claim 1, wherein the suspension polymerization is carried out in an aqueous medium containing a suspending agent.

12. The process according to claim 11, wherein the aqueous medium further contains a water phase polymerization inhibitor.

13. The process according to claim 1, wherein the suspension polymerization is effected at a temperature from 60° to 120°C.

14. The process according to claim 1, wherein said rubber is one which shows a rubbery state at room temperature and is reacted with a radical produced by the action of heat or a radical initiator to participate in graft polymerization.

15. The process according to claim 1, wherein said rubber is polybutadiene and said mixture contains acrylonitrile and styrene.

16. The process according to claim 15, wherein said mixture contains α-methylstyrene or dimethylstyrene.

17. The process according to claim 1, wherein the rubber is a styrene-butadiene copolymer and the mixture contains acrylonitrile and styrene.

18. The process according to claim 17, wherein said mixture contains α-methylstyrene or dimethylstyrene.

* * * * *